United States Patent
Clauss et al.

(10) Patent No.: US 6,428,298 B1
(45) Date of Patent: Aug. 6, 2002

(54) APPARATUS FOR PELLETIZING STRANDS OF POLYMER

(75) Inventors: Michael Clauss, Hofheim; Dirk Nissen, Frankfurt; Jochen Scheurich, Niedernberg; Werner Steinbacher, Johannesberg; Rainer Zahn; Michael Schuler, both of Grossostheim, all of (DE)

(73) Assignee: Rieter Automatik GmbH, Grossostheim (DE)

(*) Notice: Subject to any disclaimer, the term of this patent is extended or adjusted under 35 U.S.C. 154(b) by 33 days.

(21) Appl. No.: 09/610,004

(22) Filed: Jul. 5, 2000

(30) Foreign Application Priority Data

Jul. 6, 1999 (DE) .......................... 199 31 222

(51) Int. Cl.$^7$ ............................................. B29C 47/88

(52) U.S. Cl. ...................... 425/71; 425/315; 264/143

(58) Field of Search .................. 425/71, 315, 316; 264/143

(56) References Cited

U.S. PATENT DOCUMENTS

| 5,182,115 A | * 1/1993 | Nogossek et al. ............. 425/71 |
| 5,249,944 A | * 10/1993 | Zinke et al. ................. 425/71 |
| 5,863,564 A | * 1/1999 | Yoon ............................ 425/71 |

FOREIGN PATENT DOCUMENTS

| JP | 61-189908 | * 8/1986 | .................. 264/143 |

* cited by examiner

Primary Examiner—Tim Heitbrink
Assistant Examiner—Thu Khanh T. Nguyen
(74) Attorney, Agent, or Firm—Banner & Witcoff, Ltd.

(57) ABSTRACT

An apparatus for pelletizing strands of polymer emerging in molten form from dies with a pelletizer, in which apparatus a cooling section carrying a coolant flow and a dewatering section are provided between the dies and the pelletizer, a running-in rest being arranged upstream of the pelletizer, adjoining the dewatering section and provided with at least one air-nozzle arrangement, which is arranged transversely to the running direction of the strands, is designed as a step in the running-in rest and is intended for generating a stream of air directed essentially parallel to the running direction of the strands, which takes with it the strands supplied to the running-in rest.

8 Claims, 6 Drawing Sheets

APPARATUS FOR PELLETIZING STRANDS OF POLYMER

Figure 1:
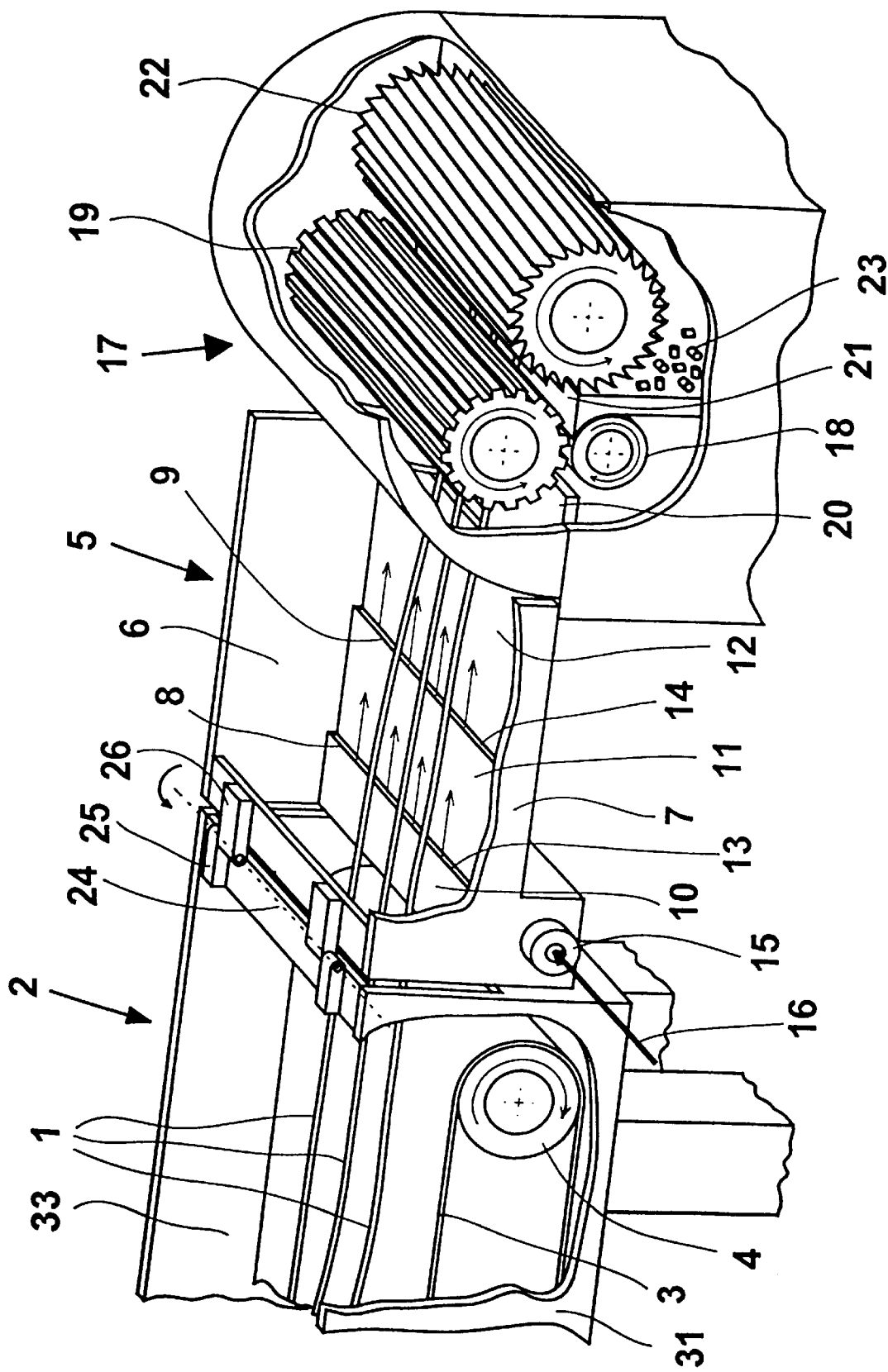

The invention relates to an apparatus for pelletizing strands of polymer emerging in molten form from dies with a pelletizer, in which apparatus a cooling section carrying a coolant flow and a dewatering section are provided between the dies and the pelletizer.

An apparatus of this type is known from DE-A 197 28 661. In the case of this apparatus, as in the case of other apparatuses of a similar type of design, there is the problem of reliably guiding the strands at the end of the dewatering section to an inlet of the pelletizer, in particular if a circulating conveyor belt is provided in the dewatering section. This problem is particularly marked if materials remaining soft even in the final state of the strands are involved. If the strands are transported here just on the basis of a pushing action, the strands tend to meander, which leads to unevenly cut pellets.

The invention is based on the object of improving the guidance of the strands in the region referred to. This takes place according to the invention by a running-in rest being arranged upstream of the pelletizer, adjoining the dewatering section and provided with at least one air-nozzle arrangement, which is arranged transversely to the running direction of the strands, is designed as a step in the running-in rest and is intended for generating a stream of air directed essentially parallel to the running direction of the strands, which takes with it the strands supplied to the running-in rest.

The air-nozzle arrangement designed as a step in the region of the running-in rest inevitably produces an air flow which runs parallel to the running-in rest downstream of the step, so that the strands arriving at this region over the step are transported continuously and only in the direction of the running-in rest and are therefore taken along by the stream of air, so that the strands do not spend any particular time on the running-in rest and the strands are therefore fed to the pelletizer uniformly as they are delivered by the dewatering section. In this case, the step in the running-in rest is the major factor for the design of the air-nozzle arrangement, since on the one hand the step causes only a slight deflection of the strands from their straight alignment and on the other hand the step offers a favorable starting direction for the air-nozzle arrangement, since the stream of air supplied by the air-nozzle arrangement emerges virtually perpendicularly from the step and then, as it proceeds, follows the running-in rest.

The air-nozzle arrangement in the step may expediently be designed as a slot nozzle. This then extends transversely over the width of the running-in rest. It is also possible, however, to design the air-nozzle arrangement as a row of individual nozzles arranged next to one another in the step, which is favorable for the formation of the step for technical production-related reasons. In addition, the choice of a favorable diameter of the nozzles provides a particularly high flow rate for the stream of air.

In order to increase the effect on the strands carried by the running-in rest, further air nozzles directed in the running direction of the strands may be provided above the running-in rest.

The running-in rest may be designed in such a way that it can be removed from between the dewatering section and the pelletizer. In this case, removal of the running-in rest creates a free space between the dewatering section and the pelletizer and consequently provides particularly good accessibility to the pelletizer, which is of advantage in particular in the case of repairs or cleaning of the pelletizer.

The removal of the running-in rest may take different forms. For instance, it is possible to arrange the running-in rest in such a way that it can be swung out. The running-in rest may, however, also be designed in such a way that it can be pushed out.

Figure 2:
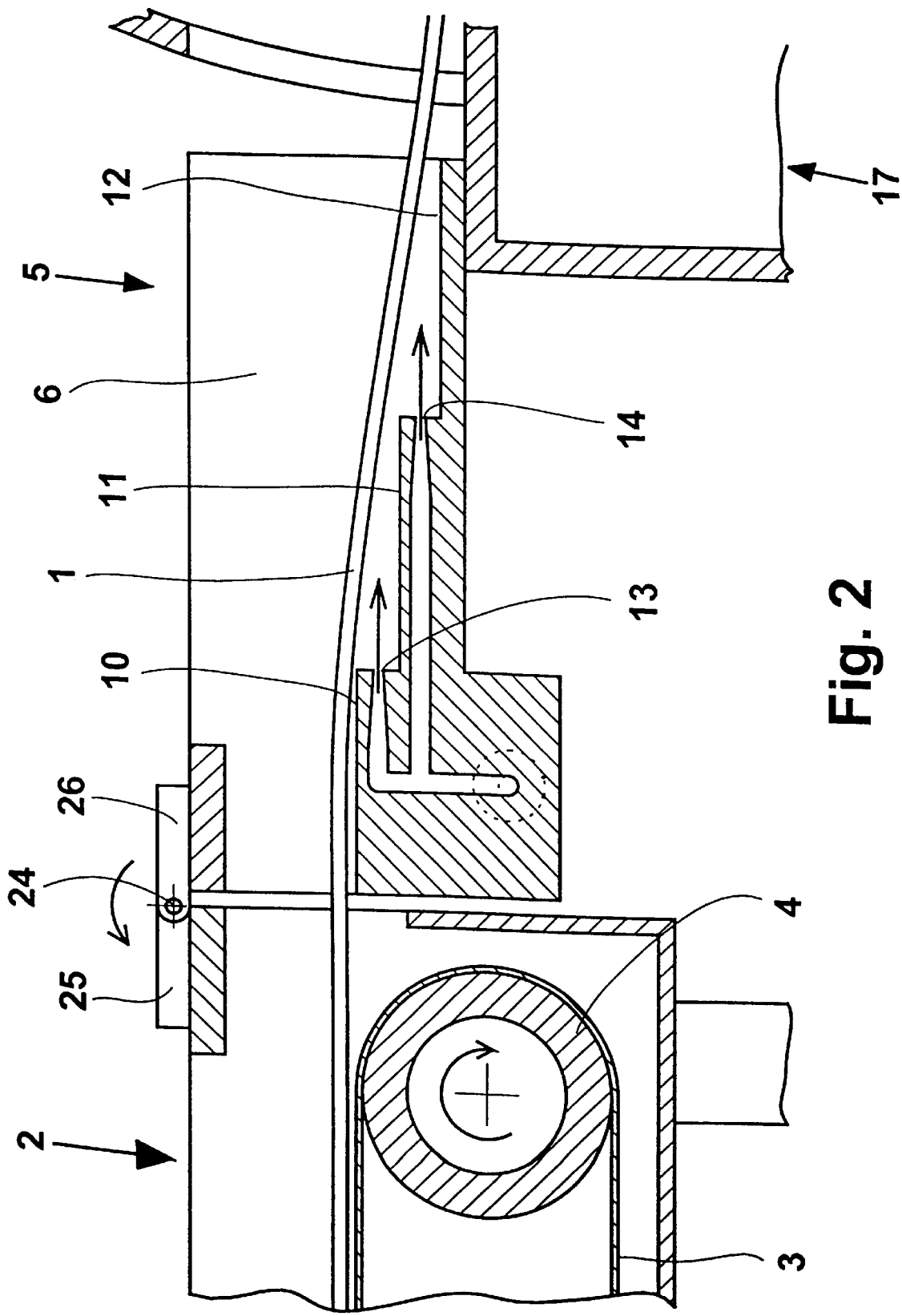
Figure 3:
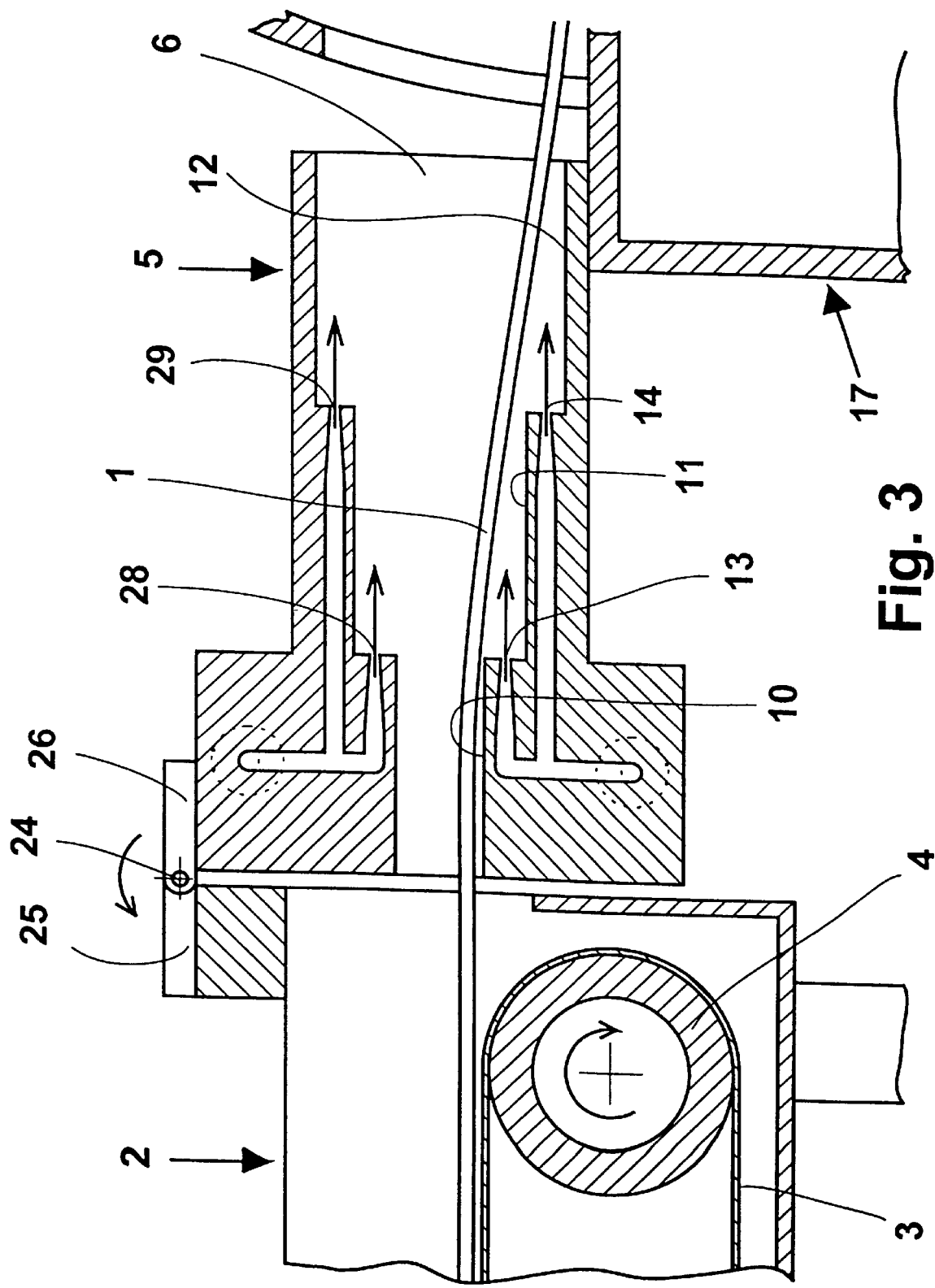
Figure 4:
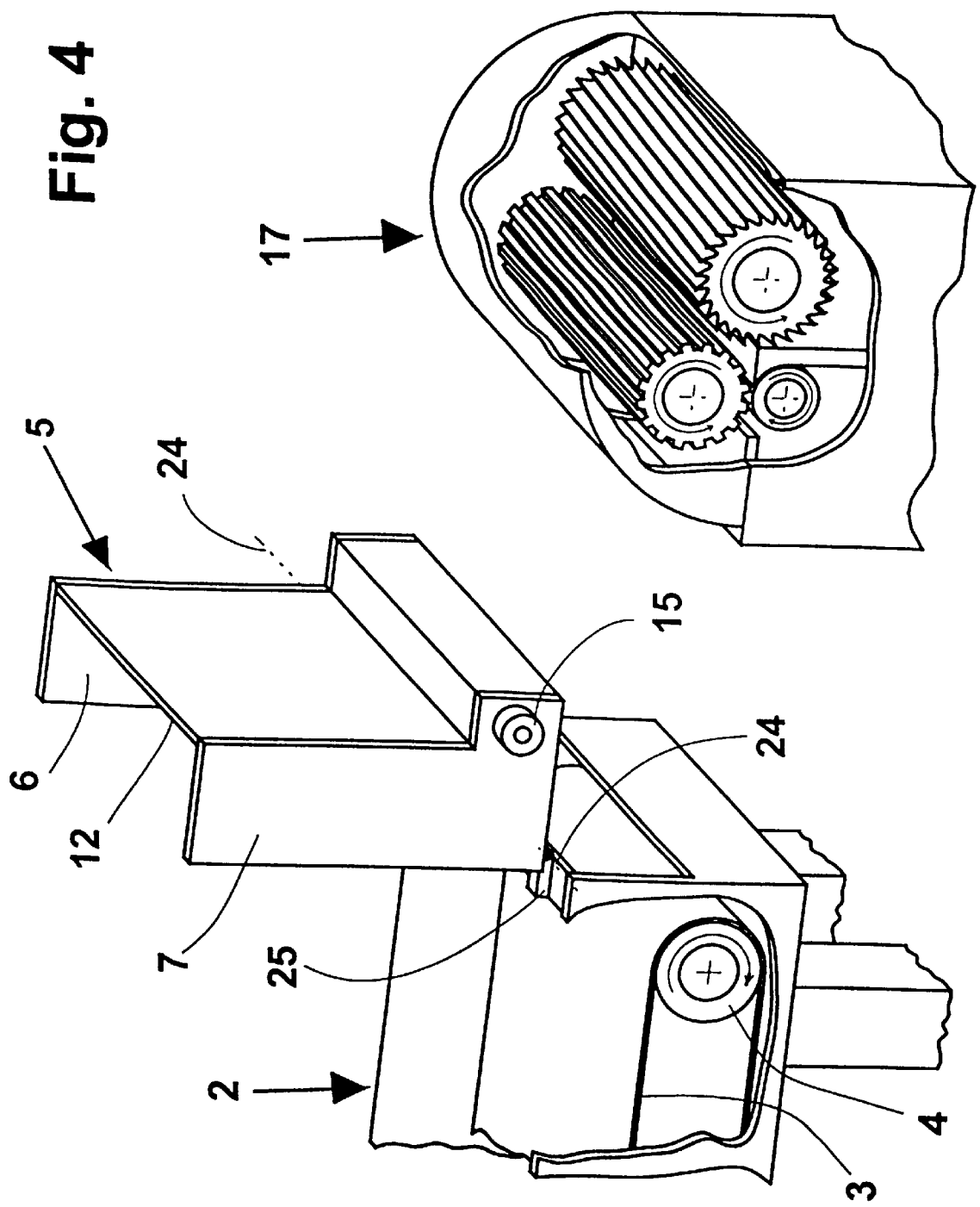
Figure 5:
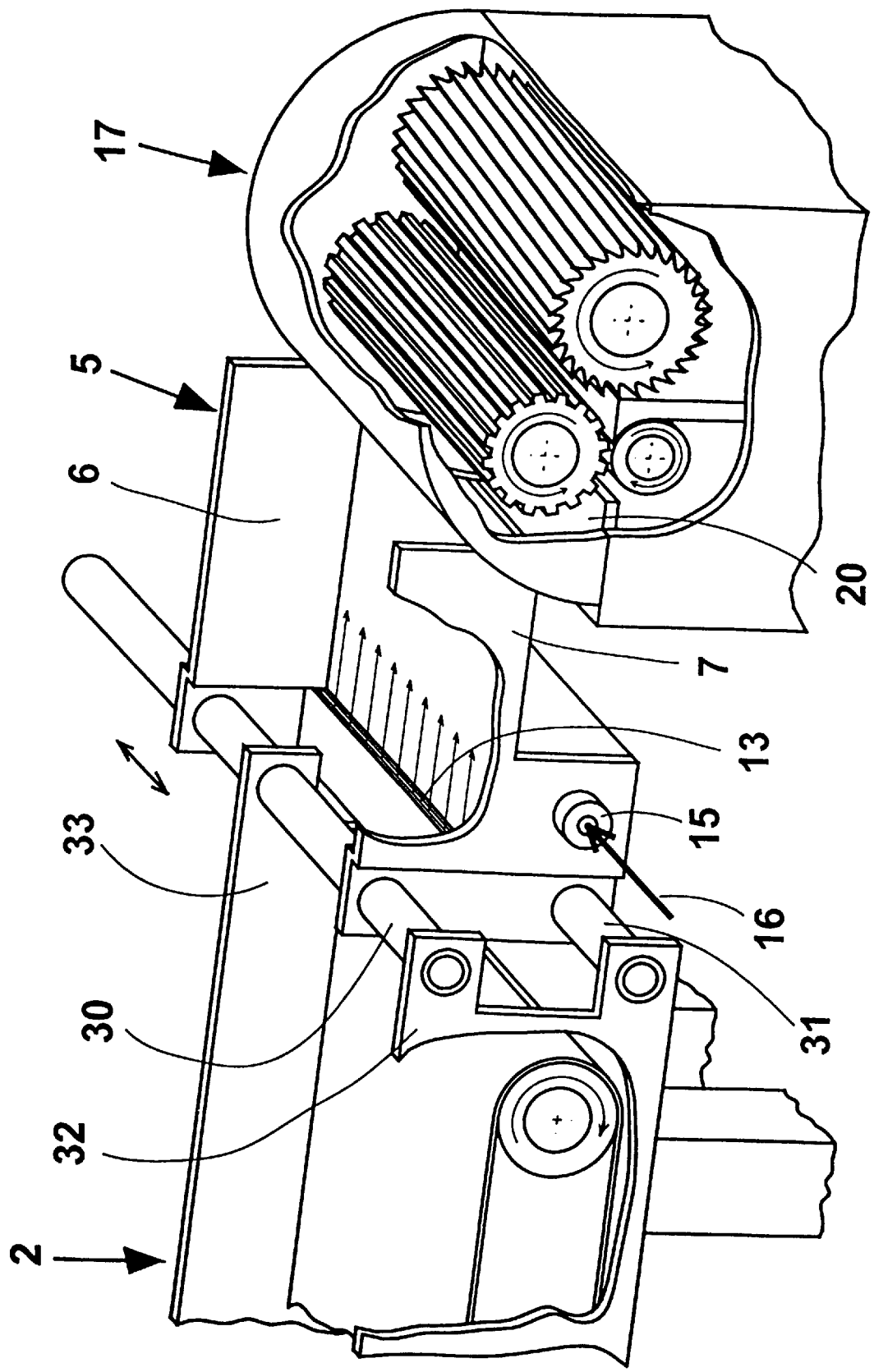
Figure 6:
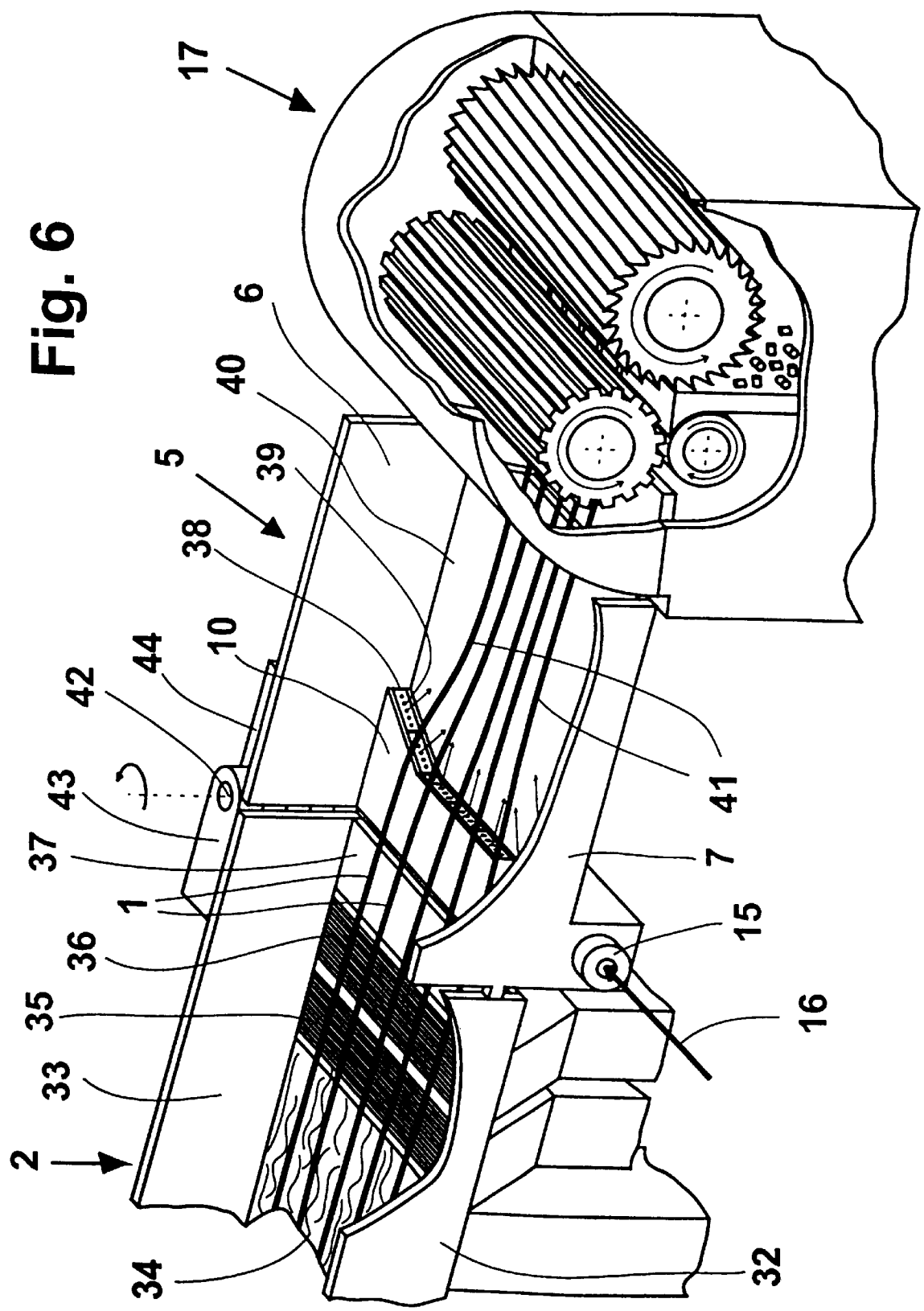

Exemplary embodiments of the invention are represented in the figures, in which:

FIG. 1 shows the apparatus in a perspective view together with the end of the dewatering section and the pelletizer, FIG. 2 shows in a basic representation a longitudinal section through the arrangement according to FIG. 1, FIG. 3 shows a modification represented in section, with air nozzles arranged above the running-in rest, FIG. 4 shows the arrangement according to FIG. 1 in a perspective view with the running-in rest swung up, FIG. 5 shows a representation of a system similar to the system according to FIG. 1, with a running-in rest which can be pushed out from the path followed by the strands, FIG. 6 shows a perspective view of a system similar to that according to FIG. 1, but with individual nozzles arranged next to one another in a step of the running-in rest.

In FIG. 1, the apparatus for pelletizing strands 1 of polymer emerging in molten form from dies (not represented here) is represented to the extent required for understanding the invention. What is shown is the end of the dewatering section 2, which follows the cooling section (likewise not represented) and in which the strands 1 are carried and transported from the circulating conveyor belt 3, the conveyor belt 3 being moved by the driven return roller 4. This much is prior art.

The dewatering section 2 is adjoined by the running-in rest 5, onto which the strands 1 are pushed by the moved conveyor belt 3. The running-in rest 5 has between the two walls 6 and 7 (the latter is drawn in a broken-away form) the two steps 8 and 9, which are preceded and followed by the resting surfaces 10, 11 and 12. In this arrangement, the resting surface 10 reaches right up to the conveyor belt 3, so that the strands 1 transported to it from the conveyor belt 3 are reliably pushed onto the resting surface 10. The step 8 is used for forming the slot nozzle 13, which extends transversely over the running-in rest 5. In a corresponding way, the slot nozzle 14, which likewise extends transversely over the running-in rest 5, is formed in the step 9. These slot nozzles are supplied with air (see depicted arrow 16) under pressure via the tubular air connection 15, so that a stream of air, indicated in each case by the four short arrows lying next to one another, leaves the slot nozzles 13 and 14, respectively, acts on the strands 1 resting on the resting surfaces 11 and 12 and takes them along with it, so that the further transport of the strands 1 is also ensured in the region of the running-in rest 5. This effect of the stream of air continues to the end of the resting surface 12, which reaches into the inlet of the pelletizer 17. In this way it is ensured that, in the region reaching from the end of the conveyor belt 3 to the inlet of the pelletizer 17 filled by the running-in rest 5, there is a pull exerted on the strands 1, which leads to reliable guidance of the strands into the pelletizer 17, so that there cannot be any meandering and consequent tangling of the strands in the region downstream of the dewatering section 2, in other words after the strands 1 have left the conveyor belt 3, which would result in unusable pellets.

As is known, the pelletizer 17 contains the two feed rollers 18 and 19, which leave between them a feed gap into which the run-in 20 of the pelletizer 17 protrudes. The strands drawn in by the feed rollers 18 and 19 then reach the counter knife 21, against which the cutting rotor 22 runs and cuts up the strands to form the pellets 23.

In FIG. 2, the arrangement according to FIG. 1 is represented in section in the form of a basic representation. According to this sectional representation, the running-in rest 5 bridges the region between the end of the dewatering section 2 and the inlet of the pelletizer 17, producing a certain distance between the pelletizer 17 and the end of the dewatering section 2, which has the result that, by removing the running-in rest 5, access is easily gained to the inlet of the pelletizer 17, so that, for example, operating personnel can easily work on the accessible pelletizer 17 if it is dirty or jammed and the like. At the same time, the slot nozzles 13 and 14 and the stream of air emerging from them have the effect that, in the region of the running-in rest 5, which is otherwise kept as short as possible for the purpose of undisturbed transport directly from the end of a dewatering section to a pelletizer, there cannot be any backing up of the transported strands 1, which are taken along by the stream of air acting on them and consequently run directly onto the inlet of the pelletizer 17, where they are then taken up by the feed rollers 18 and 19.

Like FIG. 1, FIG. 2 shows a hinge arrangement with the axis 24 and the hinge arms 25 and 26, which permit swinging up of the running-in rest 5, as is represented in conjunction with FIG. 4.

The arrangement according to FIG. 3 is a modification of the arrangement according to FIGS. 1 and 2, the modification comprising the provision not only of the slot nozzles 13 and 14 according to FIGS. 1 and 2 but also of the two slot nozzles 28 and 29 above the strands 1, these nozzles, like the slot nozzles 13 and 14, being connected to a pressurized air supply line and generating a stream of air which is directed in the running direction of the strands 1 and can also act on the strands 1 from above, in particular if ever they tend to lift off the resting surfaces 10, 11 and 12. Consequently, the slot nozzles 28 and 29, which like the slot nozzles 13 and 14 extend transversely over the running-in rest 5, can thus intensify the effect exerted on the strands 1.

In FIG. 4, the arrangement according to FIGS. 1 and 2 is represented with the running-in rest 5 swung up, in other words with the running-in rest 5 pivoted about the axis 24. It consequently largely frees the space between the outlet of the dewatering section 2 and the inlet of the pelletizer 17, thereby providing good access, as described above, to the pelletizer 17 from its inlet side.

Represented in FIG. 5 is a movement based on a different type of design of the running-in rest 5 for making the inlet of the pelletizer 17 accessible, to be precise by means of a device for transversely displacing the running-in rest 5. The running-in rest 5 is mounted here with its walls 6 and 7 on the cylinders 30 and 31, which are fastened to the walls 32 and 33 of the dewatering section 2. When the running-in rest 5 is displaced transversely to the transporting direction of the strands (not represented here), said rest slides laterally away on the cylinders 30 and 31, which can take place for example by manual displacement or else displacement by means of some known mechanism. In this case, a free space is produced upstream of the pelletizer 17, in principle in the same way as can be seen from FIG. 4, and consequently ensures accessibility to said pelletizer.

The running-in rest 5 represented in FIG. 5 is such a rest with only one slot nozzle 13, which is then adequate if the strong stream of air emerging from it is sufficient to take the supplied strands along with it over the entire region of the running-in rest 5.

Represented in FIG. 6 is a further variant of the arrangement according to FIGS. 1 and 2, concerning transport of the strands 1 in the region of the dewatering section 2 essentially by the latter being in an inclined position, a special shaping of the nozzles for the stream of air in the region of the running-in rest 5 and a special way in which the running-in rest 5 can be swung away.

The strands 1 running in over the dewatering section 2 initially slide with cooling water, indicated by the meandering lines, over the base 34 of the dewatering section, transported by the cooling water following the force of gravity, on account of a corresponding inclined position of the dewatering section 2. They then reach the two gratings 35 and 36, where residual water adhering to them is blown or sucked off, a known arrangement being concerned here. This representation is merely intended to show that the running-in rest according to the invention can adjoin any desired preceding dewatering sections and the like. After leaving the grating 36, the strands slide over the outlet base 37 of the dewatering section 2 and pass directly onto the resting surface 10, which is adjoined by the step 38. Provided in this step 38 are a relatively large number of individual nozzles 39, which are arranged next to one another and direct individual air jets at the strands 1. In this case, the step 38 forms a bent-away portion at each of its ends facing the walls 6 and 7, in such a way as to produce an overall stream of air directed at the center of the resting surface 40, leading to a forcing together of the strands 41, which results in better utilization of the pelletizer 17. In the area upstream of the arrangement represented, the strands must be guided at a certain distance from one another over the dewatering section 2, owing to their initially still existing tackiness, which however is generally no longer necessary after adequate cooling in the region of the running-in rest 5, so that here a lateral pushing together of the strands, as indicated by 41, can be achieved by the alignment represented of the air nozzles. A correspondingly narrower pelletizer can then be used for pelletizing these pushed-together strands 1. It is accordingly also possible of course to design the dewatering section 2 and the running-in rest 5 in such a way that they are initially wider, then going into a correspondingly narrower inlet of the pelletizer 17.

Provided here for the moving away of the dewatering section 2 is a hinge with the perpendicular axis 42, the hinge arm 43 of which is fastened to the wall 33 of the dewatering section 2 and the hinge arm 44 of which is fastened to the wall 6 of the running-in rest 5. For moving the running-in rest away, it is swung about the axis 42, it being necessary to ensure here of course that the run-out of the running-in rest 5 can freely describe a corresponding arc with respect to the pelletizer 17, which may take place, if appropriate, by the pelletizer 17 or the dewatering section 2 being correspondingly rounded off or slightly pushed away.

What is claimed is:

1. An apparatus for pelletizing strands (1) of polymer emerging in molten form from dies comprising a pelletizer (17), a cooling section carrying a coolant flow for cooling the strands emerging from the dies, and a dewatering section (2), wherein the cooling section and the dewatering section are provided successively between the dies and the pelletizer (17), wherein a running-in rest (5) is arranged upstream of the pelletizer (17), and downstream and adjoining the dewatering section (2), the running-in rest being provided with at least one step extending laterally of the strands and facing the pelletizer, a surface preceding the step for carrying the strands received from the dewatering section, and an air-nozzle arrangement (13, 14; 38) provided in the step (8, 9; 38) in the running-in rest (5), and wherein the air-nozzle arrangement generates a stream of air directed substantially parallel to the running direction of the strands (1) to carry with it the strands supplied to the running-in rest (5).

2. The apparatus as claimed in claim 1, wherein the air-nozzle arrangement is formed as a slot nozzle (13, 14) in the step (8, 9).

3. The apparatus as claimed in claim, 1, wherein the air-nozzle arrangement is designed as a row of individual nozzles (39) arranged next to one another in the step (38).

4. The apparatus as claimed in claim 3, wherein the individual nozzles (39) are directed in such a way that the stream of air emerging from them forces the strands (41) together on the running-in rest (5).

5. The apparatus as claimed in claim 1, wherein further air nozzles (28, 29), directed in the running direction of the strands (1), are provided above the running-in rest (5).

6. The apparatus as claimed in claim 1, wherein the running-in rest (5) is arranged in such a way that it can be removed from between the dewatering section (2) and the pelletizer 7. The apparatus as claimed in claim 6, wherein the running-in rest (5) is arranged in such a way that it can be swung out (FIGS. 1, 6).

8. The apparatus as claimed in claim 6, wherein the running-in rest (5) is arranged in such a way that it can be pushed out from the line of the dewatering section (2) followed by the pelletizer (17) (FIG. 5).

* * * * *